United States Patent
Kuroda et al.

[11] Patent Number: 5,681,112
[45] Date of Patent: Oct. 28, 1997

[54] IMAGE ENHANCEMENT

[75] Inventors: Katsuhiro Kuroda, Hachioji, Japan; Eisaku Oho, New Haven, Conn.

[73] Assignee: Hitachi, Ltd., Tokyo, Japan

[21] Appl. No.: 854,012

[22] Filed: Mar. 19, 1992

[30] Foreign Application Priority Data

Mar. 22, 1991 [JP] Japan .................. 3-081294

[51] Int. Cl.⁶ .................. G06K 9/40; G06K 9/46
[52] U.S. Cl. .................. 382/274; 382/171
[58] Field of Search .................. 382/54, 56, 18, 382/50, 171, 274, 270; 395/125; 364/920.8; 358/31; 250/311, 306, 309

[56] References Cited

U.S. PATENT DOCUMENTS

| | | | |
|---|---|---|---|
| 4,701,783 | 10/1987 | Glenn | 358/31 |
| 5,025,312 | 6/1991 | Faroudja | 358/36 |
| 5,053,888 | 10/1991 | Nomura | 382/54 |
| 5,218,649 | 6/1993 | Kunda et al. | 382/54 |

FOREIGN PATENT DOCUMENTS

| | | | |
|---|---|---|---|
| 082318 | 6/1983 | European Pat. Off. | G06F 15/20 |
| 368162 | 5/1990 | European Pat. Off. | G06F 15/68 |
| 59-141871 | 8/1984 | Japan | H04N 1/40 |
| 61-047046 | 3/1986 | Japan | H01J 37/22 |

OTHER PUBLICATIONS

Basic Technology of Optics and Images, by Dr. Takao Kaneida, Ohm Corporation, Apr. 28, 1984, pp. 1-3.
Patent Abstracts of Japan, vol. 7, No. 45, Feb., 1983, JP-A-57-197739, M. Tsutomu.
Gorlen, K.E. Computerized analytical electron microscope for elemental imaging, Review of Sci. Instruments, Feb. 23, 1984, pp. 912-921.

*Primary Examiner*—Jose L. Couso
*Assistant Examiner*—Matthew C. Bella
*Attorney, Agent, or Firm*—Fay, Sharpe, Beall, Fagan, Minnich & McKee

[57] ABSTRACT

For enhancing an image, particularly a pixel image, the image is separated into brightness information and detailed information, the detailed information is enhanced, and then the enhanced detailed information is combined with the brightness information to produce an enhanced image. The entire process may be performed on a real time basis with the scanning, without artifact and any space transformation such as Fourier transform.

15 Claims, 5 Drawing Sheets

IMAGE ENHANCEMENT

BACKGROUND OF THE INVENTION

The present invention relates to a process of enhancing a two-dimensional image and more particularly to an image processing apparatus fit for observing images under an electron microscope or a similar instrument.

There have been various techniques for enhancing images produced by electron microscopes and like instruments. For example, images may be enhanced by subjecting them to Fourier transformation and subsequent filtering, but this technique has the problem that it not only takes a great deal of processing time, but also involves the production of an artifact; it has seldom been put to practical use because of these disadvantages.

Another technique is disclosed in Japanese Patent Laid-Open No. 47046/1986, which does solve to some extent the problems mentioned above With respect to Fourier transformation. As shown in the present FIG. 5, this prior technique will select a portion 26 that is desired to be enhanced out of the entire two dimensional image 27. For example, the portion 26 may be a dark portion of the image 27. Thereafter, only the dark portion 26 is enhanced according to known technology and then the enhanced portion 26 is recombined with the remainder of the image 27 to producers composite image. This technique has the advantage of obtaining the enhanced image 26 in real time, particularly without Fourier transform and the degree of enhancement can be artificially designated. One of the problems involved with this technique is that it will produce a boundary between the enhanced portion 26 and the remaining portion of the image 27, which boundary shows as a line in the composite image. Furthermore, another problem exists that only a portion of the whole image is enhanced and if enhancement is provided to the whole image, then the technique becomes meaningless.

In addition to the above, there is known to be a technique of histogram equalization for enhancing an image, for example as disclosed in Basic Technology of Optics and Images, by Dr. Takao Kaneide, Ohm Corporation, Apr. 28, 1984, which textbook is written in the Japanese language.

SUMMARY OF THE INVENTION

It is an object of the present invention to overcome problems as discussed above, particularly to provide image processing apparatus capable of processing a whole image in real time so that the processed whole image is free from any artifact or lines produced by the processing to solve the foregoing problems completely.

In order to accomplish the objects, the present invention processes the whole image with an image space without Fourier transformation, that is without artificially setting a parameter and without transforming the image space into another space, such as a frequency space.

According to the present invention, more specifically, a whole image is separated into macroscopic brightness information for the whole image and microscopic detail information of the structural details for the whole image. Thereafter, only the information of structural details is enhanced to produce an enhanced image of structural details. Afterward, the information of brightness is added to the enhanced image of structural details to obtain a recombined whole image that is superior to that of the prior art in both processing time, complexity, and results. The reason for performing the image enhancement process only on the information of structural details is to eliminate a bad effect derived from the information of brightness in obscuring the structural details, which according to the present invention results in a desired enhancement superior to that obtained heretofore.

If image enhancement according to known techniques is effected without the separation of the information of brightness, that is according to the prior art, the enhanced information of brightness will primarily be highlighted as its signal is far stronger than the information of structural details. This means that only an image exhibiting a strong black and white contrast is obtainable but the enhanced image of the desired information of structural details is not obtainable according to the prior art. The separation between the brightness information and the information of structural details according to the present invention does not have such a problem obtained with the prior art when known image enhancing is applied to an entire image without any separation.

As processing according to the present invention is performed only in the image space without transforming to another space, the enhancement processing described above can be performed successively and substantially simultaneously with the process of fetching the two dimensional image through two dimensional scanning (of the end thereof to start with). Consequently, the whole image can be processed in real time. When the technique described in the preferred embodiment is used to effect the process of enhancing the information of brightness from the information of structural details, artificial setting of a processing parameter (such as needed in the known Fourier transform method) will be entirely unnecessary according to the present invention. Therefore, an apparatus fit for accomplishing the foregoing objects can be provided.

BRIEF DESCRIPTION OF THE DRAWING

Further objects, features and advantages of the present invention will become more clear from the following detailed description of a preferred embodiment, shown in the drawing, wherein.

DETAILED DESCRIPTION OF A PREFERRED EMBODIMENT

Figure 1:
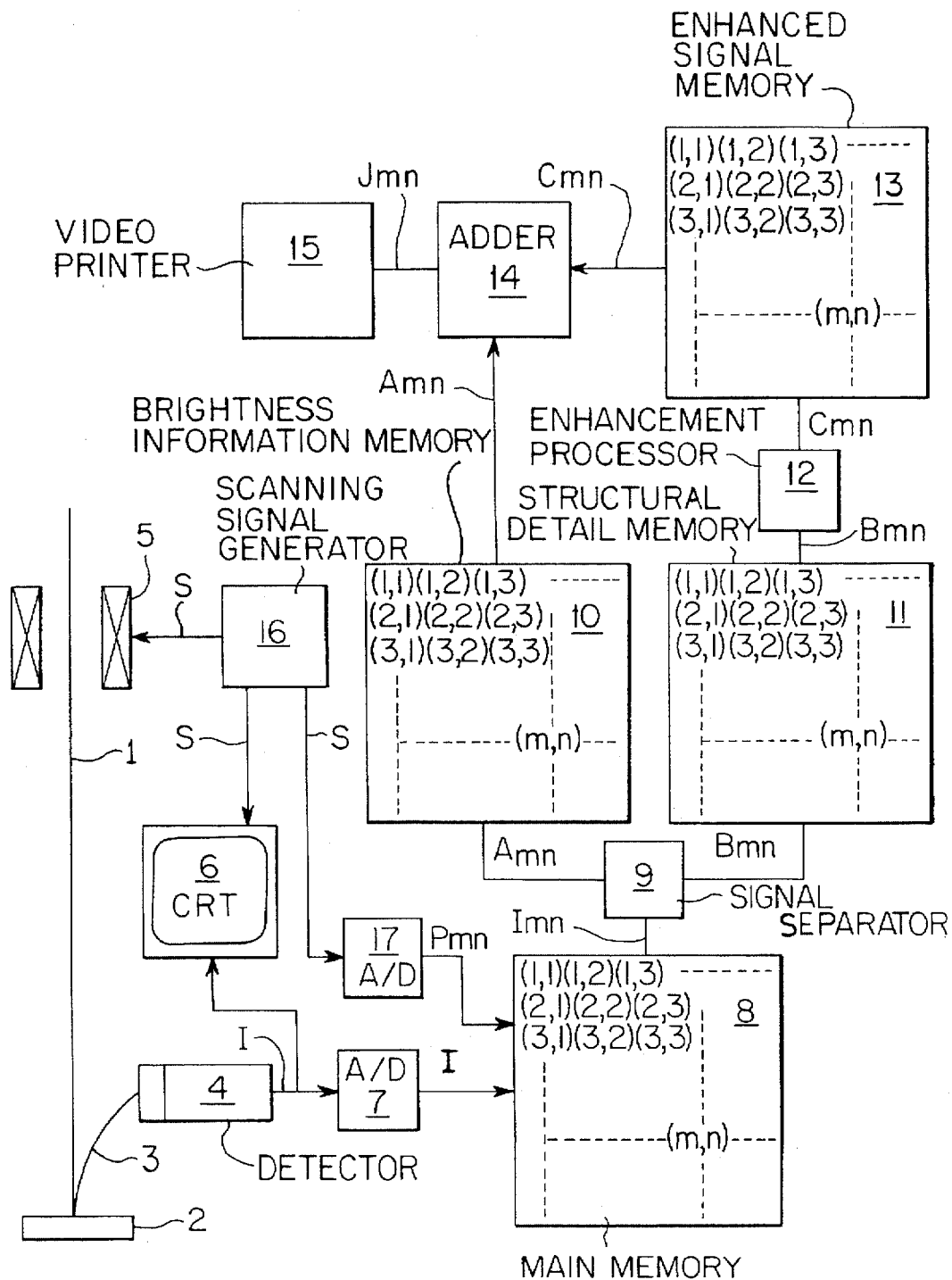
FIG. 1 is a block diagram illustrating a preferred embodiment of the present invention as applied to an electron microscope.

In the drawings, like numerals will be used to refer to like elements, in structure and function.

Figure 6:
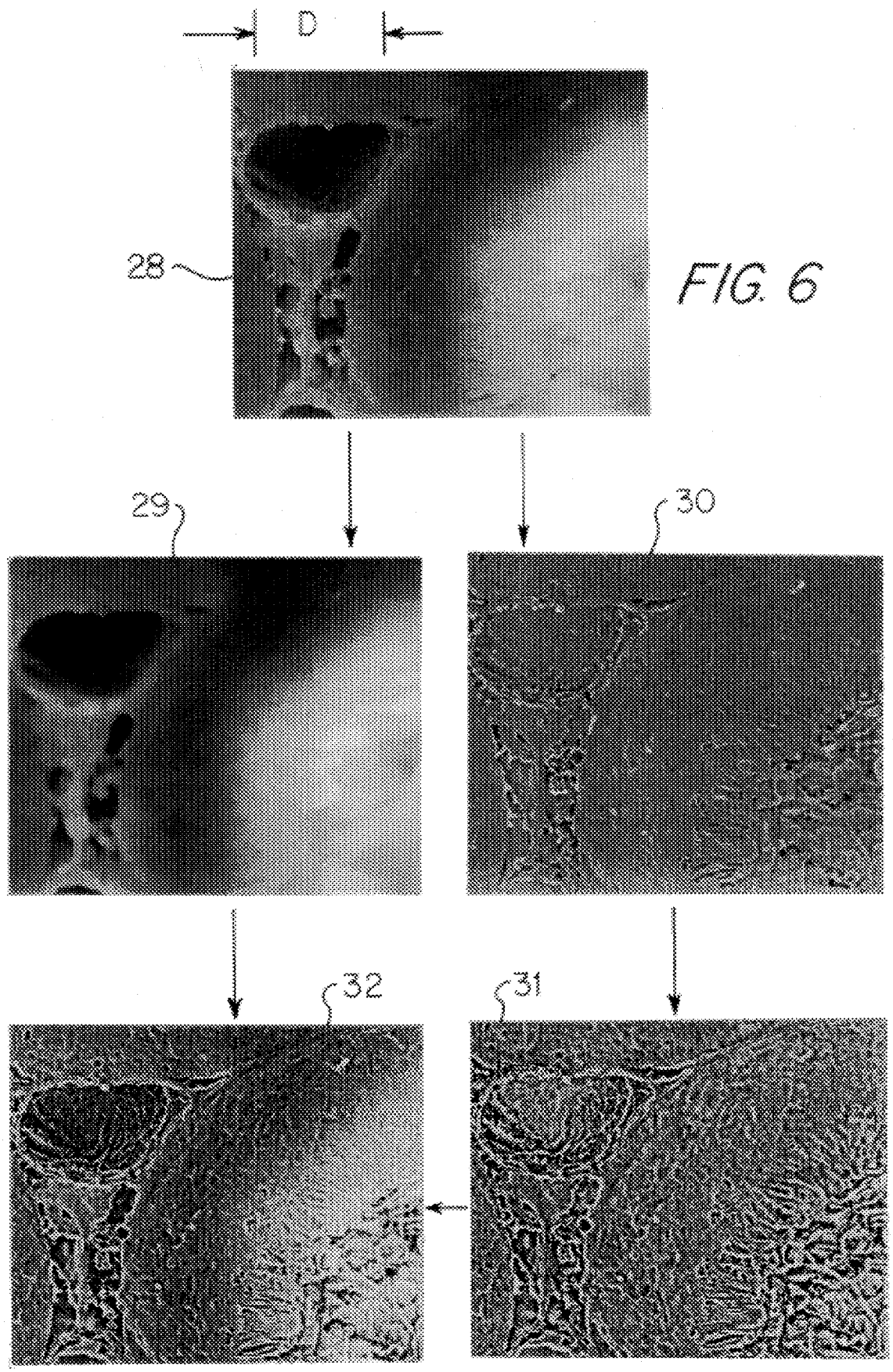
FIG. 6 is a flowchart of actual photographs of images corresponding to the histograms and steps of FIGS. 2 and 3, with the images being that of kidney cells of a rat as produced by a scanning electron microscope (SEM) and processed according to the present invention.

The preferred embodiment relates to image processing for a scanning electron microscope (SEM), wherein the entire apparatus is shown in diagrammatic form in FIG. 1. Histograms of the images obtained with the apparatus according to FIG. 1 are shown in flowchart form in FIG. 2 according to the corresponding processing steps in the flowchart of FIG. 3, and according to the same order, image photographs in flowchart form are shown in FIG. 6. It is this preferred embodiment that will be described first.

Figure 3:
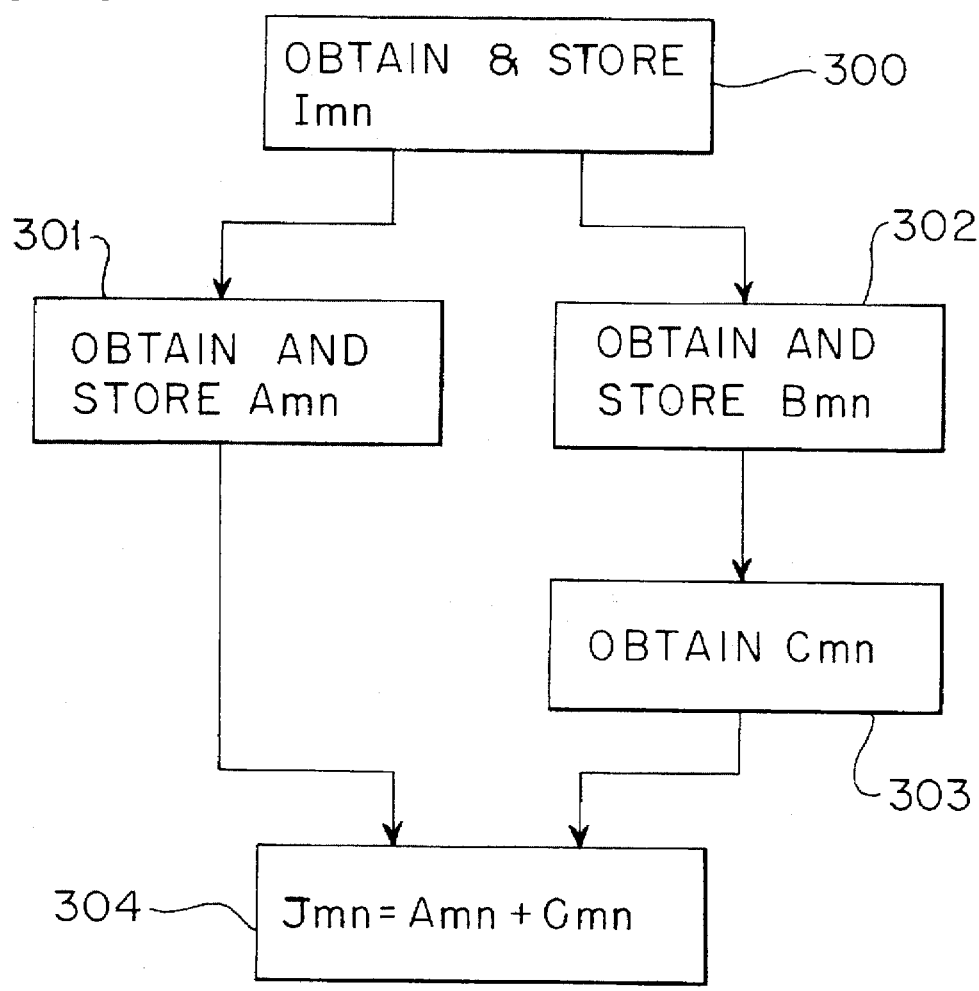
FIG. 3 is a flowchart according to the present invention conforming to the flow of histograms of FIG. 2.

In accordance with step 300 of FIG. 3 and with reference to the overall apparatus of FIG. 1, a specimen 2 has its surface normally irradiated with a primary electron beam 1 in the case of the SEM, and a detector 4 is used to detect secondary electron emission 3 to form an analog image signal I. A scanning signal generator 16 feeds a scanning position signal S to the deflector 5 to deflect the primary electron beam 1 in order to two-dimensionally (m, n) scan the surface of the specimen 2, so that at any moment, the primary electron beam 1 irradiates the specimen at coordinates m, n. The scanning position signal S is fed to a cathode ray tube (CRT) 6 along with the image signal I to display the image in real time on the CRT 6 synchronously with the scanning of the specimen 2 with the primary electron beam 1. The image thus displayed is called an SEM image of the surface of the specimen. The apparatus 1, 2, 3, 4, 5, 6, 16 is conventional in its construction and operation as described, so that further details will not be given.

Figure 2:
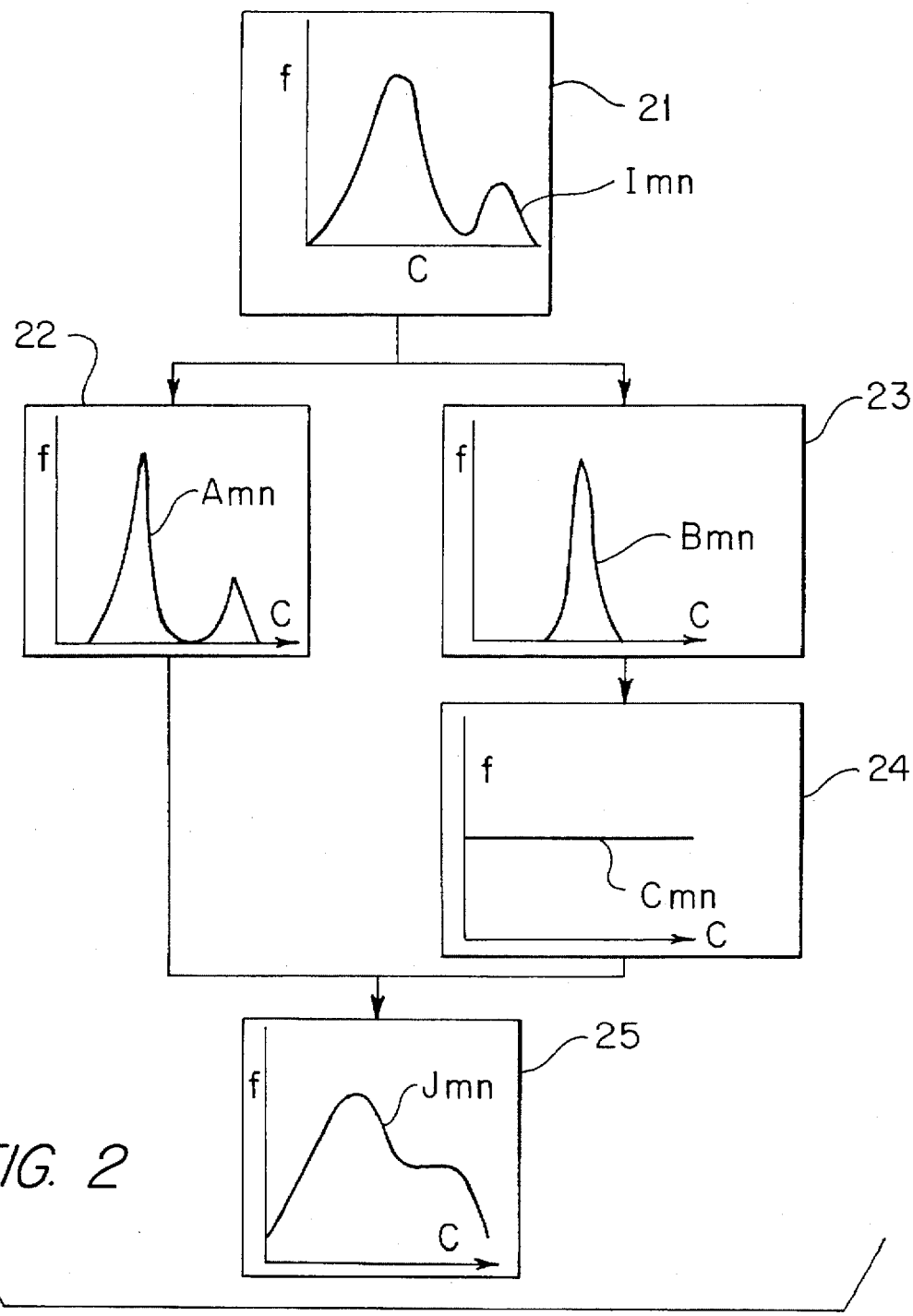
FIG. 2 is a series of histograms in flowchart format to describe the image during various processings of the present invention.
Figure 5:
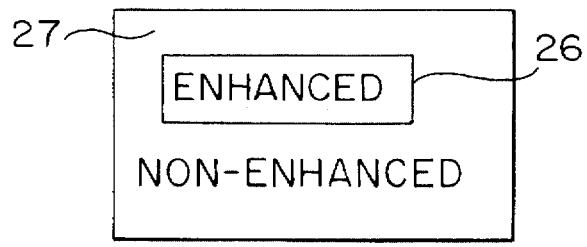
FIG. 5 is a diagram of a conventional image enhancement for SEM.

In the present invention, the strength of the image signal I is digitized by a 16-bit A/D converter 7 and stored as digital information in a main memory 8, in the form of image pixel signal strength Imn having the histogram characteristics of histogram 21 in FIG. 2 and the image form 28 as shown in FIG. 6. The scanning position signal S indicates the position of the primary electron beam 1 on the specimen 2 as determined by the scanning signal generator 16, and this scanning position signal S is digitized by an A/D converter 17 to produce a digital signal Pmn that is then supplied to the main memory 8 as pixel position signal Pmn to control addressing of the main memory 8 during such storing of the signal Imn, that is so that the signal Imn is stored at locations corresponding to the signal Pmn, particularly as pixel image information. The image pixel strength signal Imn is stored in a two-dimensional (m,n) mode determined by the pixel position signal Pmn in such a way as to correspond to the position of the primary electron beam 1 on the specimen 2. In the embodiment shown, 1024×1024 pixels were used for the whole image.

STEP 301: with respect to the digitized image pixel signal strength Imn, a median of the signal strength of 25×25 pixels of [(m−12, n−12)–(m−12, n+12)]×[(m+12, n−12)–(m+12, n+12)] is obtained by a signal separator 9 and stored in a brightness information memory 10 as a brightness information signal Amn of a pixel position (m,n). The brightness information signal Amn obtained by step 301 as the histogram 22 of FIG. 2 and the image 29 of FIG. 6.

STEP 302: in the signal separator 9, a negative signal Amn' of the brightness information signal Amn is simultaneously obtained to calculate the information of structural details, (Imn+Amn')/2=Bmn. The signal Bmn is stored i a structural detail signal memory 11 in the same matrix as memories 8 and 10 and this signal, Bmn has the histogram 23 shown in FIG. 2 and the image 30 as shown in FIG. 6. The reason for the use of the negative signal Amn' is to prevent Bmn from becoming a negative value and the reason for dividing by 2 is to prevent overflow. With respect to pixel positions, m and n will take on values only from 13 to 1012 for the successive storing of the information of detail image pixels Bmn during the scanning.

The signals described to date have been mentioned as forming the respective histograms and images of FIGS. 2 and 6. In FIG. 2, each histogram is a representation of frequency f of the occurrence of a gray scale level in the whole image according to the distribution C by means of rectangles whose widths (horizontal direction) represent class intervals (gray scale level with black being at the far left-hand portion and white being at the far right-hand portion) and whose areas are proportional to the corresponding frequencies. In FIG. 6, photographs of images of rat kidney cells processed according to the present invention are shown. The magnification of all the images is the same and is represented by the dimension D that is 5 microns according to the specific example shown in FIG. 6. With respect to FIG. 2, even though the histogram 22 is substantially similar to the histogram 21, the histogram 23 is characterized by a concentration of gray levels that are substantially centered upon the median, which indicates an originally weak contrast of the signal of structural details Bmn. From these histograms, the brightness information signal Amn is seen to represent the degree of brightness of the whole image, whereas the signal of structural details Bmn is seen to represent only the structural details of the image apart from the brightness.

STEP 303: Subsequently an enhancement processor 12 is employed that may be of any type, for example a conventional enhancement processor for histogram equalization is used in this embodiment. The enhancement processor receives the signal of structural details Bmn and through the enhancement process makes the frequency of gray scale distribution uniform to produce the enhanced image of structural details signal Cmn having the histogram 24 as shown in FIG. 2, having the image 31 as shown in FIG. 6, and which is stored in the enhanced signal memory 13, preferably in the same format as the memories 8, 10 and 11. As seen, particularly in FIG. 2, this process of enhancement changes the signal Bmn of histogram 23 into the signal Cmn of the histogram 24 and thereby less frequent gray levels are condensed whereas more frequent gray levels are enlarged. In other words, the contrast as a whole is enhanced because the number of pixels belonging to a portion to be enlarged is greater than the number of pixels whose gray levels range is condensed. The basic enhancement process of histogram equalization has been known to feature high noise-resistance as compared with an enhancement process using a differential system. To increase the processing speed, it is preferable to have the number of bits used to define each pixel reduced during the enhancement processing, for example in the specific embodiment, 16 bits were used to define each pixel for the signal Bmn, whereas only 8 bits were used to define the signal Cmn exiting from the enhancement processor 12. The basic problem for enhancement is to determine which of the gray level values should be allocated to pixels at the same gray level when the gray level is enlarged. Selection of such a gray level value may be made at random or gray level values may otherwise be arranged in order proportionally to the gray level on the periphery of each pixel.

STEP 304: Subsequent to the production and storage of the signal of enhancement details Cmn, the signals Amn and Cmn are retrieved respectively from storage in memories 10 and 13 to be input to the adder 14 where they are combined to produce the image enhancement signal Jmn, that is shown in the histogram 25 of FIG. 2 and which produces the image 32 of FIG. 6. This signal Jmn may be output to any output device, such as a video printer 15 to obtain the desired enhanced image, which in the preferred embodiment is about 1,000×1,000 pixels. In the embodiment shown, approximately 2,000 scanning lines were used for the SEM with the signal strength of 2 scanning lines being combined to produce one scanning line signal, which one scanning line signal was input to the A/D converter. With such a process of combining scanning lines input to the A/D converter, the signal to noise ratio has been improved, because the two lines were added to get a mean value.

The operation of the present invention with respect to a preferred embodiment has been described.

With reference to FIG. 6, the actual images produced with an operation according to the preferred embodiment are shown. The original image 28 produced by the signal Imn was obtained from a scanning electron microscope SEM with a specimen from a rat kidney. The brightness image 29 was produced from the signal Amn and indicates the rough brightness of the whole image 28, which is mainly used to depict three dimensional information of the whole image. The image of structural details 30 was produced from the signal Bmn to show only the structural details, that is the structural details that appear when the brightness information is subtracted from the original image 28. It is seen that the image of structural details 30 is a plane image and deficient in three dimensional image information. The enhanced image of structural details 31 is that produced by the signal Cmn, which was obtained by enhancing the information of structural details, that is by enhancing the image 30 through the histogram equalization process, and it is seen that these details have been enhanced clearly. However, it is noted that the enhanced image of structural details 30 still lacks a three dimensional impression, that is still lacks the information of brightness. Therefore, the brightness image 29 is added to the enhanced image 32 by combining the signals Cmn and Amn in the adder 14 to obtain the enhanced image 32 having both the enhanced structural details and the three dimensional impression. A comparison of the enhanced image 32 with the original image 28 clearly shows the advantages obtained with the present invention.

Figure 7:
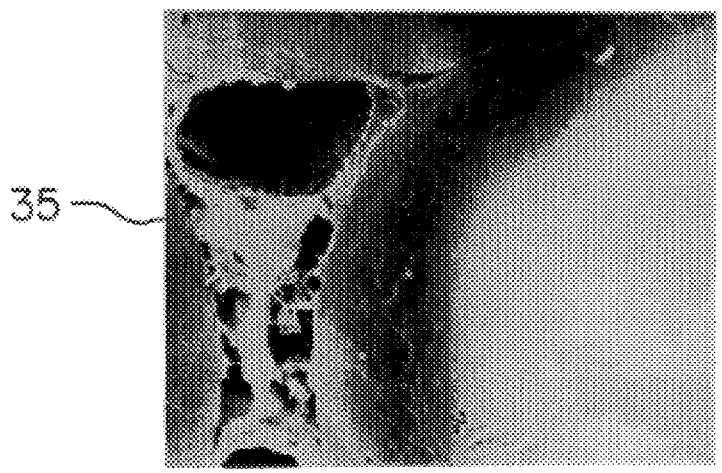
FIG. 7 is an actual image photograph of the same input image 28 of FIG. 6 after enhancement by the identical enhancement process used to enhance the image 30 into the image 31 of FIG. 6.

As a further indication of the importance of the present invention, the original image 28 was enhanced by exactly the same enhancement process used to enhance the image 30 to obtain the image 31 and this resulted in a conventional enhanced image 35 shown in FIG. 7. The conventional enhanced image 35 was obtained by directly passing the signal Imn through the enhancement processor 12 bypassing the signal separator, so that the output of the enhancement processor 12 was a signal that directly produced the conventional enhanced image 35 shown in FIG. 7. From a comparison of FIG. 7 and the enhanced image 32 of the present invention, it is seen that the present invention has a superior affect in clarifying the image.

While the preferred embodiment of the present invention specifically used histogram equalization for the enhancement processor 12, other types of enhancement processing may be used. Further, other numerical values than those used in the preferred embodiment may be employed. For instance, though 25×25 pixels have been employed for effecting the median filter processing in the signal separator 9 to produce the brightness signal Imn, fewer or more pixels may also be used to make the processing feasible. It is preferred that N used in the N×N pixels used for median filtering processing be an odd number so that the middle pixel of the N×N array of pixels will be at the coordinates m,n of the brightness signal thus obtained. Most preferably, N is within a range of 11 to 31, to produce median filter processing with a pixel array of 11×11 to 31×31 pixels, which has been found to be practical from experience when processing time and the degree of enhancement of an image are taken into consideration. Although the median of the image signal strength Imn for such an N×N array has been used to process the brightness information signal Amn, a mean value may be used instead, as an example of a modification of the present invention that is also contemplated. Use of a low-pass filter may also contribute to process simplification and reduced processing time. The essential point is that the separating process performed by the signal separator 9 separates the degree of brightness of the pixels from the original image to produce the signal Amn.

While the present invention has used histogram equalization as a process performed by the enhancement processor 12, other processors may be employed. For example, a gray level transformation curve may be used to transform the signal Bmn to the signal Cmn. The gray level transformation curve may be a fixed curve when images of a particular type are repeatedly processed, for example in the case of repeatedly processing images of semiconductors that should generally have the same configuration. If the specimen changes, the operator may select a specific gray level transformation curve that is specifically applicable to the new specimen, or may select a specific gray level transformation curve upon viewing the original image. The use of a gray level transformation curve will shorten the time of enhancement as compared to the processing by histogram equalization of the preferred embodiment. In the preferred embodiment, the histogram equalization as an enhancement process is performed automatically, without any need to select a parameter, for example a specific gray level transformation curve which is an advantage of the preferred embodiment, even though the preferred embodiment takes longer processing time than would be in the case of a transformation curve. The use of a transformation curve would be in accordance with a special case of enhancement.

Figure 4:
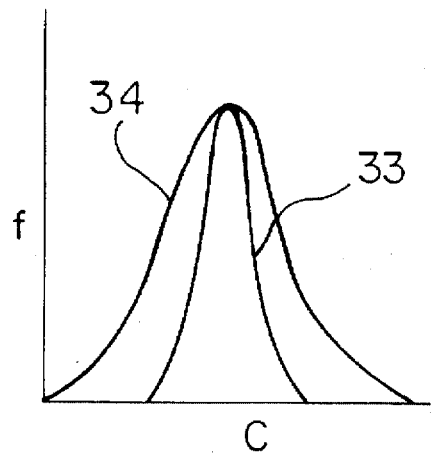
FIG. 4 is histograms showing another enhancement process of structural details as a variation of the histograms 23, 24 of FIG. 2.

As gray levels of the image or structural details substantially center on the median in the histogram and the preferred embodiment, in general, an effect similar to that of the preferred embodiment can be gained through simple enlargement of the histogram as shown in FIG. 4, as a further variation of the enhancement. As shown in FIG. 4, the histogram 33, corresponding to the histogram 33 of FIG. 2, represents the signal Bmn, and mere enlargement of the histogram to the full black/white range of the histogram to produce the histogram 34 would produce corresponding signal Cmn of enlarged gray level that would be an enhancement, which enhancement could be performed automatically and more quickly than with the histogram equalization.

From the above variations in the preferred embodiment, it is seen that different separators than the signal separator 9 may be employed and different enhancement processors than the preferred embodiment enhancement processor 12 might be employed in accordance with the broader aspects of the present invention, even though those specifically disclosed have certain advantages.

As a further variation, coarse scanning can be used once to acquire principal information for each process beforehand, such as a parameter to be used in a transformation curve, e.g., coarse scanning may be used for 100 lines instead of 1,000 or 2,000, once to acquire principal information of each process beforehand and then to perform each process accordingly. Since all the processes can be fulfilled instantly on a real time basis with respect to the scanning, processing speed is made higher.

In the preferred embodiment of the present invention, the SEM has been used as shown in FIG. 1. However, the present invention is also applicable to other imaging than SEM, for example transmission electron microscopes (TEMs) that are in wide use today, instruments similar to scanning transmission electron microscopes (STEMs) and scanning tunneling microscopes (STMs) that make signals available in time series for the use of a scanning electron beam. Although the images of TEM are not normally subject to a time series, the time series can be obtained by acquiring the signals in time series by setting a pick-up element on the image forming plane. Moreover, the present invention is also applicable to image enhancement processes in other fields, particularly concerning images for diagnosis in x-ray computer tomography (CAT), magnetic resonance imaging (MRI) and the like in addition to images in optical microscopes such as laser beam microscopes other than the electron microscopes.

Processed images free from an artifact are effectively obtained according to the present invention as no processing parameters are artificially assumed, particularly since there is no size division of the image that would produce a line or Fourier transforms. Moreover, since the enhancement process is conducted in the real space of the image itself, image signals can be processed sequentially as they are fetched simultaneously with their production in scanning, so that the whole image can be subjected to the processing with the effect of providing an image processing apparatus capable of enhanced images in real time without artifacts.

While a preferred embodiment has been set forth along with modifications and variations to show specific advantageous details of the present invention, further embodiments, modifications and variations are contemplated within the broader aspects of the present invention, all as set forth in the spirit and scope of the following claims.

We claim:

1. An image processor included in an instrument for enhancing image data produced by moving an electron beam over a surface, said image data representing a whole image, comprising:

means for moving an election beam over a surface to produce a plurality of image pixel data;

means for digitizing the image pixel data;

means for storing the digitized image pixel data in an array according to the two dimensional coordinates of each pixel relative to the whole image;

separator means for separating the digitized image data into brightness image data of brightness information about the whole image, each pixel brightness data being obtained for a unique point of the whole image from an adjacent portion of the image data of N×N pixels data around the unique point, and detail image data of detail information of structural details about the whole image;

means for storing the brightness image data in an array according to the two dimensional coordinates of each pixel relative to the whole image;

means for storing the detail image data in an array according to the two dimensional coordinates of each pixel relative to the whole image;

means for enhancing the detail image data to produce enhanced detail image data of structural details by making a frequency of gray level distribution represented by the enhanced detail image data more uniform than the detail image data by enlarging the range of gray levels for some of the detail image data and condensing the range of gray levels for others of the detail image data;

means for storing the enhanced detail image data in an array according to the two dimensional coordinates of each pixel relative to the whole image; and means for combining the enhanced detail image data and the brightness image data to thereby produce image enhanced data of the whole image.

2. The image processor according to claim 1, wherein said separator means separates the image data into the detail image data having a plurality of detail pixel data, each detail pixel data being obtained by subtracting the pixel brightness data at a unique point from the image data at the same unique point.

3. The image processor according to claim 1, wherein N is an integer ranging from about 11 to 31 and wherein each pixel brightness data is the mean value of the image data of the N×N pixels.

4. The image processor according to claim 1, wherein N is an integer ranging from about 11 to 31 and wherein each pixel brightness data is the median value of the two dimensional image data of the N×N pixels.

5. The image processor according to claim 1, wherein said means for enhancing performs the enlarging the range of gray levels for a greater number of detail image data than the number of detail image data having their range of gray levels condensed.

6. The image processor according to claim 1, wherein said separator means outputs the brightness image data in a digitized form of p bits and outputs the detail image data in digitized form of p bits; and wherein said means for enhancing putputs the enhanced detail image data in a digitized form less than p bits to provide for fast enhancement processing.

7. An instrument including the image processor according to claim 1, said means for producing the image data including means for sequentially obtaining the image data.

8. The apparatus according to claim 7, wherein said means for producing further includes:

means for producing a scanning signal;

said means for scanning being responsive to said scanning signal for deflecting the beam for obtaining the scanning of the beam across the surface; and said means for producing also detecting secondary radiation from the surface as the secondary radiation is formed by irradiating the surface with the beam.

9. The apparatus of claim 8, including display means responsive to the scanning signal and the image data for two dimensionally displaying the whole image on a real time basis with the scanning.

10. The apparatus of claim 8, including:

analog to digital converter means for converting the scanning signal into a digitized position signal on a real time basis with the scanning; and means for storing the digitized image data at storage positions corresponding to the digitized position signal on a real time basis with the scanning;

wherein said digitizing means converts the image data into digitized image data on a real time basis with the scanning.

11. The image processor according to claim 1, wherein said separator means separates the image pixel data into the brightness image data having a plurality of pixel brightness data, so that each pixel brightness data is obtained for a unique point (m, n) of the whole image from the median of image data of N×N image pixel data uniformly around the unique point, wherein the median is defined as {(m−((N/2)−1), n−((N/2)−1))→(m−((N/2)−1), n+((N/2)−1))}×{(m+((N/2)−1), n−((N/2)−1))→(m+((N/2)−1), n+((N/2)−1))}, with N being an integer at least 3.

12. The apparatus of claim 11, wherein said separator means obtains the detail image data by obtaining one-half the sum of the image data plus the negative of the brightness image data for each unique point (m, n).

13. An image processor for enhancing, on a real time basis, sequentially received image data representing a whole image, comprising:

separator means for sequentially separating, on a real time basis, the image data as it is sequentially received into brightness image data of brightness information about the whole image and detail image data of detail information of structure details about the whole image;

means for sequentially enhancing, on a real time basis, the detail image data as it is separated by said separator means to produce enhanced image data of structural details; and means for sequentially combining on a real time basis, the enhanced image data and the brightness image data to thereby produce image enhancement data.

14. A method for producing an enhanced image, comprising:

two-dimensionally scanning a sample according to a pixel position scanning signal and sequentially producing pixel data for representing an image of the sample;

sequentially separating each pixel data on a real time basis with said scanning into brightness pixel data and detail pixel data of structural details;

sequentially enhancing the detail pixel data on a real time basis with said scanning to correspondingly produce enhanced pixel detail image data; and sequentially combining the enhanced pixel detail image data and the brightness pixel data to produce pixel image enhanced data on a real time basis with said scanning;

storing each of the brightness pixel data, detail pixel data and enhanced pixel image data at memory positions corresponding to the pixel position scanning signal, sequentially for each pixel position on a real time basis with said steps of separating, enhancing and combining, respectively; and continuing said steps of separating enhancing and combining on a real time basis until all pixel data representing a whole image has been processed to produce the pixel image enhanced data for at least a major portion of the whole image.

15. The method of claim 14, including obtaining all of the pixel image enhanced data from the pixel data on a real time basis in a single domain without transforming any data into another domain for said steps of separating, enhancing and combining.

* * * * *